May 8, 1945.  J. G. DE FLON  2,375,528
SPRAY NOZZLE
Filed April 13, 1943
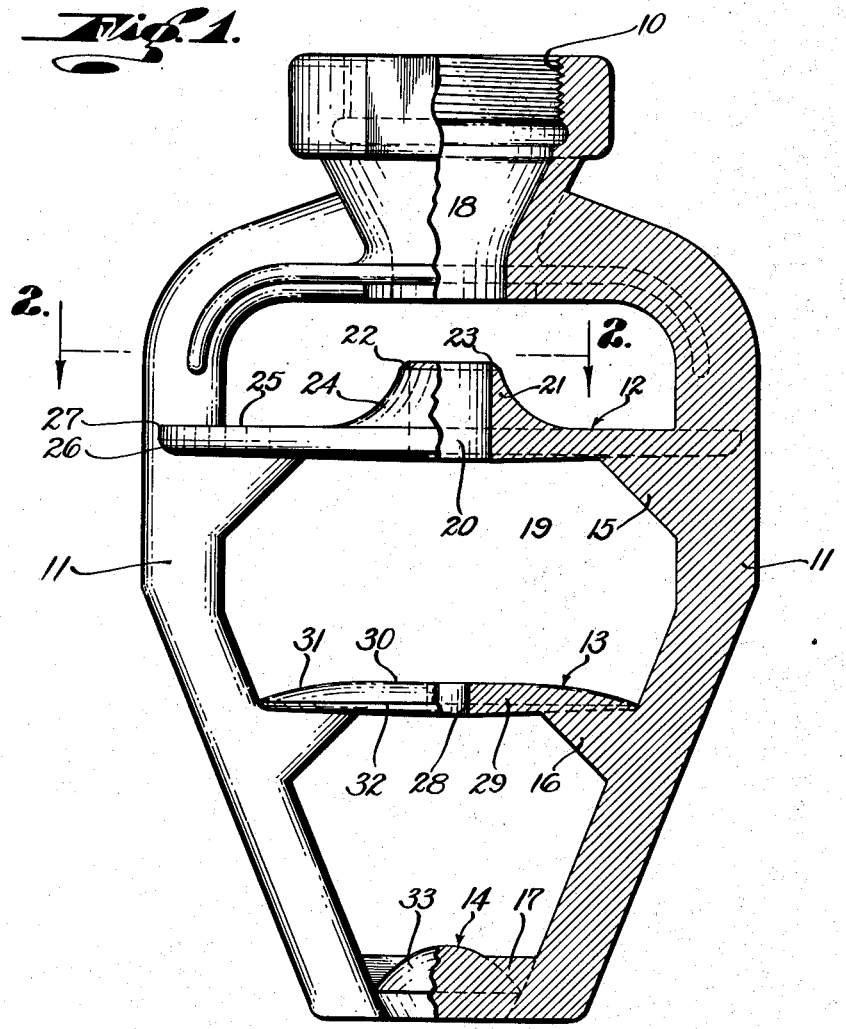
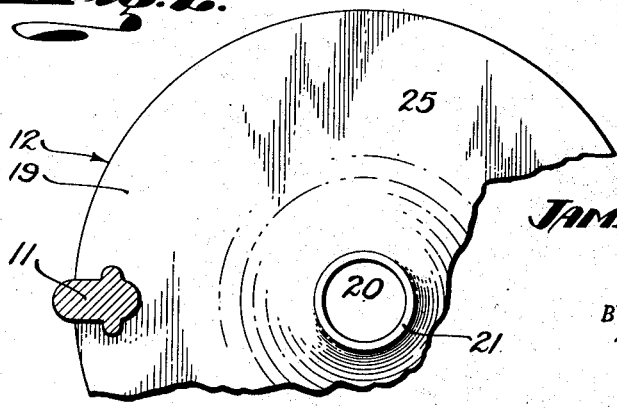
JAMES G. DE FLON
INVENTOR.
BY H. Calvin White
Attorney Patented May 8, 1945

2,375,528

UNITED STATES PATENT OFFICE 2,375,528

SPRAY NOZZLE

James G. De Flon, Los Angeles, Calif., assignor to The Fluor Corporation, Ltd., Los Angeles, Calif., a corporation of California Application April 13, 1943, Serial No. 482,857

1 Claim. (Cl. 299—121)

This invention pertains to improvements in spray nozzles of the kind used in water cooling towers, and particularly of the multiple and differential size plate or baffle type in which a portion of the stream of water directed downwardly against the central apertured portion of an upper baffle, is deflected by and sprayed outwardly from the baffle surface, and the remaining portion of the water is passed by the baffle opening to strike and become deflected by one or more baffles below.

In operation, nozzles of this type deflect the water outwardly in a succession of super-imposed individual sprays corresponding in number to the number of baffles, all in a manner tending to project the water over a desired area and to cool the water by virtue of its fine particle dispersion and aeration. Nozzles of this multiple baffle type have given good results generally with respect to their water distributing and cooling capacities, due to a large extent to the particular forms and water dispersing characteristics of the individual baffles. Typical of such known nozzles are those disclosed in Tappen Patent No. 2,005,600 showing a centrally apertured baffle plate with a raised neck portion about the aperture, and in Phillips Patent No. 1,877,046 in which the plate has a substantially flat area about its central aperture. One characteristic of the Tappen plate is its ability, resulting largely from its centrally necked form, to project the water outwardly over a wide radius. A particular advantage of the Phillips type of flat surface plate is its tendency to create on the plate itself a degree of turbulence and preliminary aeration of the water resulting in the formation of a finely divided and well dispersed spray.

For maximum efficiency it is important that each individual plate-projected spray be permitted to assume its particular pattern and to cover its particular portion of the entire area over which water is sprayed by the nozzle assembly, without interference with another individual spray. More specifically, it is desirable that the top plate distribute the spray over an outer annular area, and that the plate next below disperse its spray over an adjacent inner annular area, and so on as additional plates are used, so that as far as practicable the individual plate sprays cover respective and non-overlapping areas. Where impingement of the spray occurs, the nozzle loses efficiency because of the obvious tendency of the spray merger to prevent maximum dispersion and aeration of the water particles and their uniform distribution over the entire area encompassed by the outermost spray. This, heretofore, has been an objectionable performance feature of multiple plate nozzles, and is the principal disadvantage which the present invention aims to improve and correct.

In accordance with the invention, the individual plates of the nozzle assembly are given different shape and surface characteristics in order that together, they will result in the formation of non-interfering sprays together producing a composite spray giving uniform distribution of the total water over an entire area encompassed by the widest spray. It is preferred to use a top plate or baffle adapted to project its spray over a comparatively wide radius, and for this purpose I employ a substantially flat (outer) surface baffle, for example the type shown in the above mentioned Tappen patent. The second or next lower plate is designed to limit its water throw to substantially the inner radius of the top baffle spray, and to give substantial turbulence and aeration to the water on the surface of the baffle. For this purpose the general type of baffle shown in the Phillips patent is suited. Although the nozzle assembly may comprise any suitable number of individual plates, I have shown herein, as illustrative, a three baffle nozzle in which the water passing through the second baffle strikes a convex surface of a third baffle shaped to throw its spray within an area inside the inner radius of the second baffle spray, the three sprays thus giving successive and uniform water distribution.

Further objectives and details will be more fully understood from the description to follow, throughout which reference is had to the accompanying drawing in which:

Fig. 1 is an elevation, partly in section, showing a preferred embodiment of the invention; and Fig. 2 is a fragmentary plan on section 2—2 of Fig. 1.

Although the individual parts of the nozzle may be assembled in any desired manner, it is preferred to make the entire nozzle as a single casting. The nozzle may be made of any desired material, such as metals or plastics, e. g., Bakelite, suitable for casting or molding.

The nozzle comprises a threaded inlet 10 adapted to be attached to a water supply pipe, and a frame structure including a pair of oppositely disposed arms or brackets 11 which carry the plates or baffles 12, 13 and 14. The baffle supports are re-enforced by webs 15, 16 and 17 cast integrally with the frame and baffles as illustrated. Water entering the inlet is directed downwardly through a convergent throat 18 which centers the water stream, at the proper velocity, upon the top baffle 12.

Baffle 12 comprises a circular disc 19 having a central opening 20 in axial alinement with throat 18 in the head of the nozzle. The plate has about the opening 20 an annular raised or necked portion 21 having a top beveled surface 22 forming a sharp water diversion edge 23. Below surface 22 the upset has an outward flare 24 terminating in a surrounding substantially flat surface 25. The periphery 26 of the disc may be rounded or otherwise sloped, substantially as illustrated, to provide a fairly sharp edge 27 at which the water leaves the disc. The important feature of the top baffle is its substantially flat surface, although the raised neck feature also is desirable since both features tend to give this desired wide spread to the projected spray.

The second baffle 13 has a central aperture 28 alined with and having a smaller diameter than opening 20 in the disc above. Baffle 13 has the form of a circular disc 29, the top surface of which extends horizontally at 30 from the edge of the aperture 28. While surface 30 may have a slight outward slope, it is preferred for best results that it be flat, or substantially truly horizontal, and that it extend radially from the axial center of the plate a distance which is at least about one-fourth the plate radius, and less than about one-half that radius. Beyond surface 30, the top of the disc has a convex curvature at 31 extending to the beveled edge 32 of the disc. It is preferred that the radial extent of the convex surface 31 be at least about one-half the radius of the disc.

The bottom baffle 17 preferably has a continuously convex surface 33 of considerably greater curvature than the convex surface 31 of the plate above, and is positioned symmetrically with relation to the vertical axis of the nozzle so that water passing through aperture 28 strikes the top central area of surface 33 and becomes deflected uniformly in all directions.

An outer annular portion of the water stream directed against the top baffle 12 is diverted by the upset 21 outwardly over the horizontal surface 27, and is projected in a uniformly dispersed spray into the atmosphere surrounding the baffle. The combined effects of the upset 21 and the horizontal surface 27, cause the water to become projected in a comparatively wide spray pattern encompassing, as it falls below the nozzle, a relatively large area. Water flowing through opening 20 and striking the top horizontal surface of the baffle 13, is deflected outwardly and downwardly over the convex surface 31. The shape of the resulting spray pattern however is somewhat different from the pattern of the spray leaving the top baffle 12, due to the tendency of the flat surface 30 to cause greater turbulence and aeration of the water on the plate, and the effect of the convex surface 31 in causing the spray to assume a more downward course than it would take in the absence of the convex shape. With the baffle and apertures dimensioned substantially as shown, the spray leaving baffle 13 ultimately in its course of fall will extend outward to about the inside of the spray projected from the top baffle 12, but without any considerable overlapping or interference of the sprays.

The water falling from aperture 28 onto the convex surface 33 of the bottom baffle is given still greater downward direction and at an angularity such that the radial extent of the resulting spray reaches the inner spread of the spray from baffle 13, but again without considerable overlapping or interference of the two sprays. The combined effect of the baffles thus is to produce a composite spray having at a distance below the nozzle, (e. g., in a horizontal plane about four inches below a nozzle of the shape and dimensions shown in the drawing) substantially uniform distribution of the water particles over the entire area between the outermost extent of the top spray, and the innermost extent of the bottom spray.

While the invention has been described with reference to a specifically illustrated nozzle assembly, it will be understood that various minor changes in the shapes and dimensions of the parts may be made without departure from the intended spirit and scope of the invention.

I claim:

A spray nozzle comprising a top baffle having a centrally located annular raised and downwardly flared portion containing an opening and surrounded by a horizontal surface extending to substantially the edge of the baffle, means for directing a stream of water downwardly against the top of the baffle and through said opening so that a portion of said stream is deflected outwardly along said surface and is dispersed therefrom in a relatively wide spray by reason of the horizontal extent of the surface, a second baffle spaced below said top baffle and having an aperture smaller than and alined with said opening, said second baffle having a top surface extending substantially horizontally from said aperture to a surrounding convex surface along which a second portion of said stream passed through said opening is deflected outwardly and downwardly from the baffle in a second spray which is mainly confined to the inside of said first spray by reason of the convexity of said second baffle surface, and a third baffle spaced below said second baffle and having a top convex surface of greater convexity than said convex surface of the second baffle and against which a third portion of said stream passed through said aperture is deflected outwardly and downwardly beyond the baffle in a spray mainly confined to the inside of said second spray by reason of the said greater convexity of the third baffle surface.

JAMES G. DE FLON.